Figure 1:
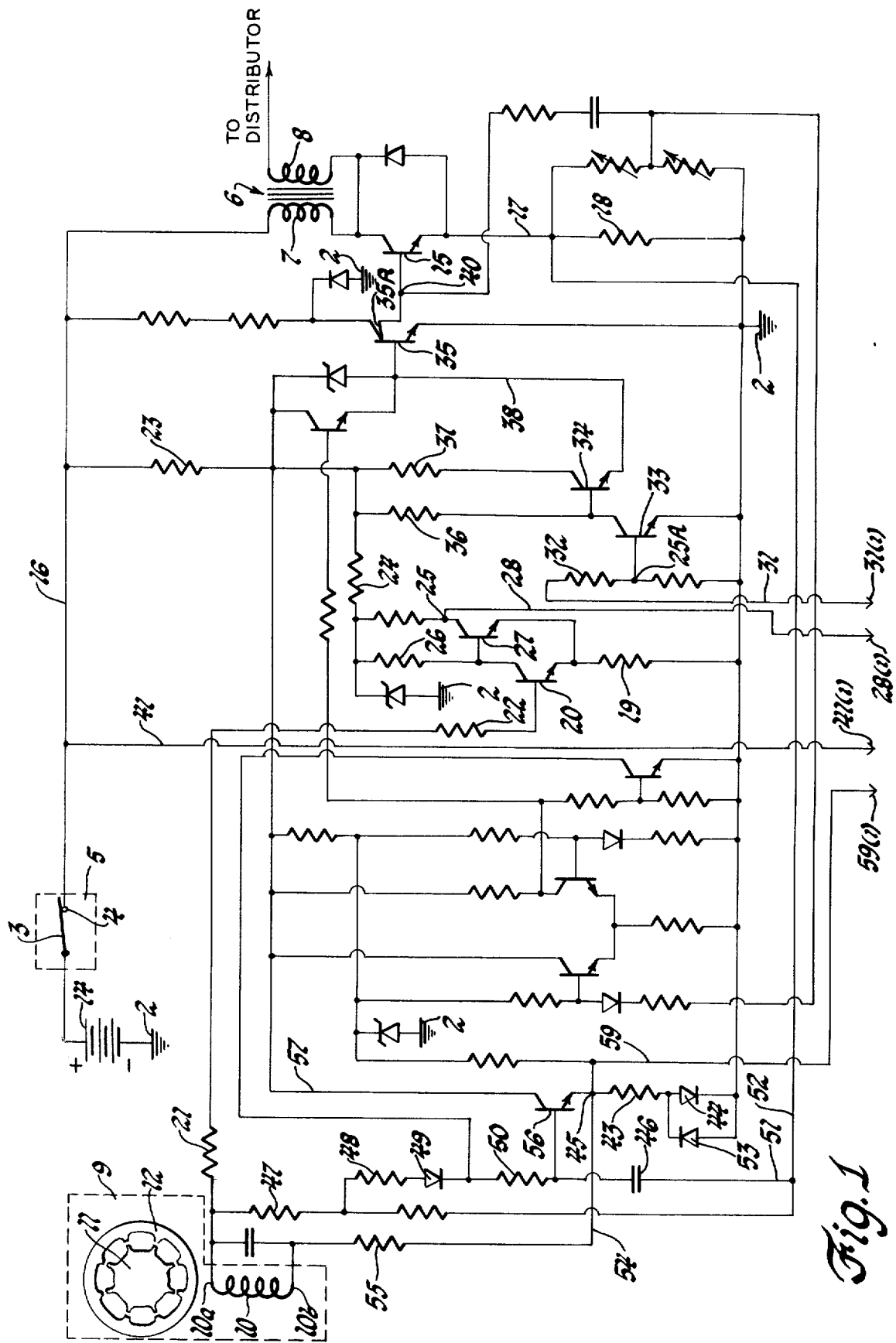

United States Patent [19]

Hart

[11] 4,261,312
[45] Apr. 14, 1981

[54] INTERNAL COMBUSTION ENGINE ELECTRONIC IGNITION SYSTEM HAVING AN ENGINE SPEED SENSITIVE VARIABLE IGNITION SPARK RETARD FEATURE

[75] Inventor: William Hart, Kokomo, Ind.

[73] Assignee: General Motors Corporation, Detroit, Mich.

[21] Appl. No.: 72,199

[22] Filed: Sep. 4, 1979

[51] Int. Cl.³ .............................................. F02P 5/08
[52] U.S. Cl. .................................... 123/418; 123/414; 123/415; 123/421
[58] Field of Search ............... 123/414, 415, 416, 418, 123/421, 424, 146.5 A

[56] References Cited

U.S. PATENT DOCUMENTS

| | | | |
|---|---|---|---|
| 3,890,944 | 6/1975 | Werner et al. | 123/146.5 A |
| 3,901,201 | 8/1975 | Mizuguchi et al. | 123/414 |
| 4,023,359 | 5/1977 | Masaki et al. | 123/415 |
| 4,077,372 | 3/1978 | Masta | 123/418 |
| 4,117,820 | 10/1978 | Kashiwazaki et al. | 123/421 |
| 4,131,098 | 12/1978 | Daniels et al. | 123/415 |
| 4,133,325 | 1/1979 | West | 123/416 |
| 4,164,204 | 8/1979 | Guipaud | 123/415 |

Primary Examiner—Charles J. Myhre
Assistant Examiner—Andrew M. Dolinar
Attorney, Agent, or Firm—Richard G. Stahr

[57] ABSTRACT

During the presence of a selected internal combustion engine operating parameter such as a coolant temperature range, the alternating current timing signals induced in the output coil of an electrical generator assembly having at least a rotor member rotated in timed relationship with the engine are overridden by the output signal of a circuit combination that produces the output signal during the positive going portion of each of the timing signals and maintains the output signal for a period of time that varies inversely in duration as the potential level with respect to ground of an engine speed variable potential signal varies directly with engine speed to provide an engine speed ignition spark retard that diminishes substantially linearly in value from maximum to minimum between selected first lower and second higher engine speeds.

5 Claims, 6 Drawing Figures

INTERNAL COMBUSTION ENGINE ELECTRONIC IGNITION SYSTEM HAVING AN ENGINE SPEED SENSITIVE VARIABLE IGNITION SPARK RETARD FEATURE

This invention is directed to an internal combustion engine electronic ignition system combination and, more specifically, to the improvement of an engine speed sensitive variable ignition spark retard feature for providing, with the presence of at least one engine operating parameter, an ignition spark retard that decreases substantially linearly in value from maximum to minimum between selected first lower and second higher engine speeds.

With catalytic converter equipped internal combustion engines of the spark ignition type, it is desirable that the temperature of the converter be rapidly brought up to the desired operating temperature at which the efficiency thereof is substantially maximum. This may be accomplished by retarding the ignition spark, the more the ignition spark retard value, the faster the converter temperature rises to the desired value. However, as the rate at which the temperature of the converter increases to the desired operating temperature increases as engine speed increases, it is important that the amount of ignition spark retard be decreased as the speed of the engine increases and should be reduced to substantially zero at a predetermined engine speed as determined by the operating characteristics of the engine. It has been found that the converter normally operates at or near the desired operating temperature with engine coolant temperatures of the order of 125° F. and higher and that engine "start" is difficult if not impossible with the ignition spark retarded with engine coolant temperatures of the order of 70° F. and less. Therefore, the engine ignition spark retard that is provided to rapidly raise the converter temperature to the desired operating temperature should be introduced with engine temperatures within the range betweeen 70° F. and 125° F. and while the engine is operating between two selected engine speeds. Therefore, an internal combustion engine electronic ignition system having an engine speed sensitive variable ignition spark retard feature that is operational only during the presence of at least one selected engine operating parameter to provide an ignition spark retard that diminishes substantially linearly in value from maximum to minimum between selected first lower and second higher engine speeds is desirable with catalytic converter equipped internal combustion engines.

It is, therefore, an object of this invention to provide an improved internal combustion engine electronic ignition system combination.

It is another object of this invention to provide an improved internal combustion engine electronic ignition system combination including the provision of an all electronic engine speed sensitive variable ignition spark retard feature that is effective with the presence of at least one selected engine operating parameter.

It is another object of this invention to provide an improved internal combustion engine electronic ignition system combination that includes an all electronic engine speed sensitive variable ignition spark retard system that produces, with the presence of at least one selected engine operating parameter, an output signal that is effective to override, for a time duration that varies inversely with engine speed, the alternating current timing signals that are produced in timed relationship with the engine by an associated electrical generator assembly.

In accordance with this invention, there is provided an internal combustion engine electronic ignition system including an all electronic engine speed sensitive variable ignition spark retard feature that provides, with the presence of at least one selected engine operating parameter, an engine speed ignition spard retard that diminishes substantially linearly in value from maximum to minimum between selected first lower and second higher engine speeds.

Figure 2:
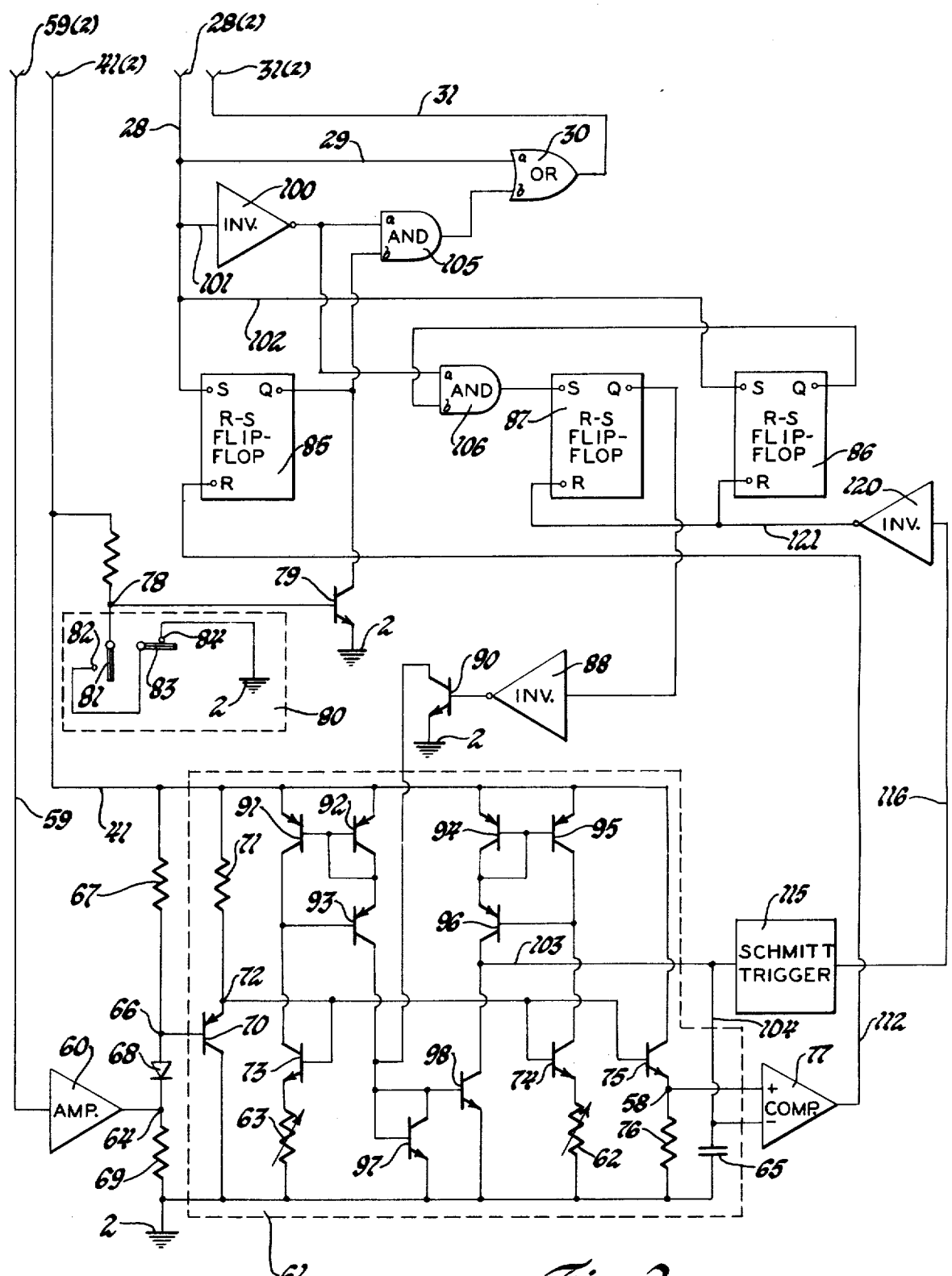

For a better understanding of the present invention, together with additional objects, advantages and features thereof, reference is made to the following description and accompanying drawing in which:

FIG. 1 sets forth a timing signal responsive electronic control unit for effecting the completion and subsequent interruption of the ignition coil primary winding energizing circuit with which the retard feature of this invention may be employed;

FIG. 2 sets forth in schematic form the circuit combination that provides an engine speed sensitive variable ignition spark retard; and FIGS. 3 through 6 are respective curves useful in understanding the operation of the circuitry of FIGS. 1 and 2.

As point of reference or ground potential is the same point electrically throughout the system, it is illustrated in FIGS. 1 and 2 of the drawing by the accepted schematic symbol and is referenced by the numeral 2.

The circuit combination of FIG. 2 employs three conventional inverter circuits, two conventional AND gate circuits, a conventional OR gate circuit, three conventional R-S flip-flop circuits, a conventional Schmitt trigger circuit, a conventional amplifier circuit and a conventional voltage comparator circuit. As these circuit elements may be commercially available items well known in the art and, per se, form no part of this invention, each has been illustrated in block form in the drawing. Alternatively, these circuit elements may be formed on an integrated circuit chip. Furthermore, these devices are only examples of circuit elements suitable for use with the circuit of this invention, consequently, there is no intention or inference of a limitation thereto as other circuit elements having similar electrical characteristics may be substituted therefor without departing from the spirit of the invention.

In accordance with logic terminology well known in the art, throughout this specification logic signals will be referred to as "High" or logic 1 and "Low" or logic 0 signals. For purposes of this specification, and without intention or inference of a limitation thereto, the "High" or logic 1 signals will be considered to be of a positive polarity potential and the "Low" or logic 0 signals will be considered to be of zero or ground potential.

In the interest of reducing drawing complexity, specific operating potential connections to various circuit elements of FIG. 2 are not shown. It is to be specifically understood, however, that during circuit operation, operating potential is supplied to the circuit elements of FIG. 2, as required.

The internal combustion engine electronic ignition system having an engine speed sensitive variable ignition spark retard feature of this invention is set forth schematically in FIGS. 1 and 2. FIG. 1 illustrates an electrical signal responsive electronic control unit for effecting first the completion of and later the interruption of the ignition coil 6 primary winding 7 energizing circuit in timed relationship with an associated internal combustion engine, not shown, in response to each cycle of a series of alternating current timing signals that are induced in pickup coil 10 of an electrical generator assembly 9 having a rotor member 11 rotated in timed relationship with the associated internal combustion engine and FIG. 2 illustrates the circuit combination improvement of this invention that provides an engine speed sensitive variable ignition spark retard feature that is operational only during the presence of at least one selected engine operating parameter to provide an ignition spark retard that diminishes substantially linearly in value from maximum to minimum between selected first lower and second higher engine speeds.

Also in the interest of reducing drawing complexity, the associated internal combustion engine with which the electronic ignition system combination of this invention may be employed is not illustrated in FIG. 1. It is to be specifically understood, however, that the circuit combination of FIGS. 1 and 2 may be used with any conventional well known spark ignited internal combustion engine of any number of cylinders.

Figure 3:
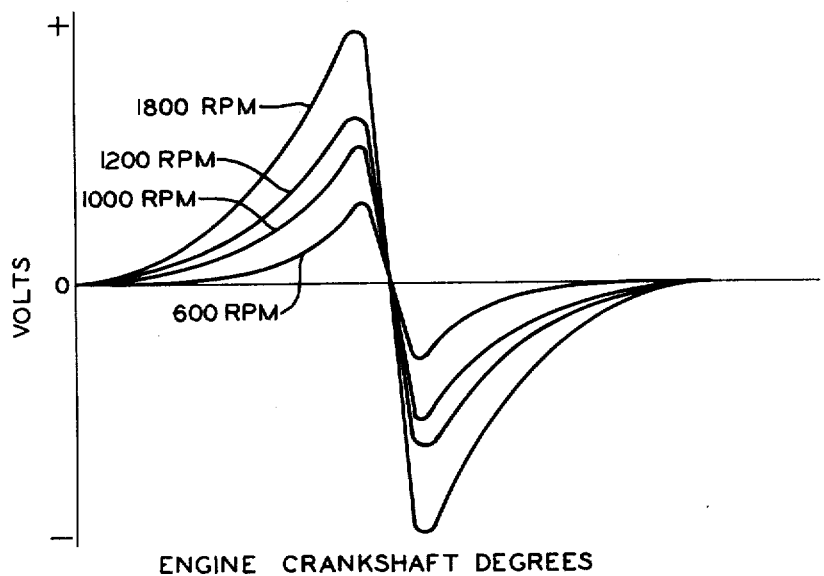

Referring to FIG. 1, the electronic control unit employed in an actual embodiment of this invention is set forth in combination with a source of alternating current timing signals, electrical generator assembly 9, a direct current potential source, which may be a conventional storage battery 14, and an ignition coil 6, which may be a conventional automotive type ignition coil well known in the art having a primary winding 7 and a secondary winding 8 in which a high sparking potential is induced upon the interruption of the energizing circuit of primary winding 7. Rotor member 11 of electrical generator assembly 9 is driven by the associated internal combustion engine in timed relationship with the engine in a manner well known in the automotive art. For example, rotor member 11 may be mounted upon the ignition distributor shaft in such a manner as to be rotated therewith while the distributor shaft is rotated in timed relationship with the engine by a gear drive to the engine camshaft as is common in the automotive art. One complete cycle of the alternating current timing signals produced by an actual electrical generator assembly for each of four different engine speeds is illustrated by the curves of FIG. 3. Although these timing signals pass through zero in a positive to negative going direction at substantially the same engine crankshaft angle, the amplitude of these timing signals is directly proportional to engine speed, the greater the engine speed the greater the amplitude.

The energizing circuit for primary winding 7 of ignition coil 6 may be traced from the positive polarity output terminal of battery 14 through the movable contact 3 and stationary contact 4 of electrical switch 5, while closed, positive polarity potential lead 16, primary winding 7 of ignition coil 6, the collector-emitter electrodes of NPN switching transistor 15, lead 17, resistor 18 and point of reference or ground potential 2 to the negative polarity output terminal of battery 14. As is well known in the automotive art, upon each interruption of the energizing circuit of primary winding 7 of ignition coil 6, an ignition spark potential is induced in secondary winding 8 that is directed by the ignition distributor to the spark plug of the cylinder of the associated engine to be fired. With regard to electrical switch 5, movable contact 3 and stationary contact 4 may be the normally open "ignition circuit" contacts of a conventional automotive type ignition switch.

The source of alternating current timing signals, electrical generator assembly 9, may be any one of the several conventional magnetic distributors well known in the automotive art. One example of a magnetic distributor well known in the automotive art suitable for use with the system of this invention is of the variable reluctance type disclosed and described in U.S. Pat. No. 3,254,247, Falge, that issued May 31, 1966 and is assigned to the same assignee as that of the present invention. In the interest of reducing drawing complexity, the variable reluctance type ignition distributor disclosed and described in U.S. Pat. No. 3,254,247 has been set forth schematically in FIG. 1. Rotor member 11 is rotated in timed relationship with the associated engine by the engine in a manner well known in the automotive art within the bore of a pole piece 12. Equally spaced about the outer periphery of rotor member 11 and about the bore of pole piece 12 are a series of projections equal in number to the number of cylinders of the engine with which the distributor and system of this invention is being used. The electrical generator assembly 9 illustrated in FIG. 1 is for use in an 8-cylinder engine. Pole piece 12 may be made up of a stack of a number of laminations of magnetic material secured in stacked relationship by rivets or bolts or any other convenient fastening method and the magnetic flux may be provided by a permanent magnet, not shown, which may be secured to the lower face surface thereof. As each projection on rotor member 11 approaches a projection on pole piece 12, the reluctance of the magnetic path between rotor member 11 and pole piece 12 decreases and as each projection on rotor member 11 moves away from a projection on pole piece 12, the reluctance of the magnetic circuit between rotor member 11 and pole piece 12 increases. Consequently, the magnetic field produced by the permanent magnet increases and decreases as each projection on rotor member 11 approaches and passes a projection on pole piece 12, a condition that induces an alternating current potential in pickup coil 10, magnetically coupled to pole piece 12, of a waveform substantially as shown in FIG. 3.

The electronic control unit of FIG. 1 is employed in the actual embodiment of the ignition system of this invention and is responsive to the alternating current timing signals induced in pickup coil 10 of electrical generator assembly 9 to energize and deenergize the ignition coil 6 primary winding 7 in timed relationship with the associated internal combustion engine. This electronic control unit is disclosed and described in detail in U.S. Pat. No. 3,838,672, Richards et al, that issued Oct. 1, 1974 and is assigned to the same assignee as is that of the present invention. For purposes of this specification, however, the operation of the pertinent portion of this electronic control unit will be briefly described with regard to the normal operation thereof in response to the alternating current timing signals while the ignition spark retard circuitry of FIG. 2 is disabled.

During the positive polarity excursion of each cycle of the alternating current timing signals induced in pickup coil 10 of electrical generator assembly 9 while terminal end 10a thereof is of a positive polarity with respect to terminal end 10b and of a sufficient magnitude to supply base-emitter drive current to NPN transistor 20 through resistors 21 and 22, transistor 20 is rendered conductive through the collector-emitter electrodes thereof. Conducting transistor 20 diverts the base-emitter drive current normally supplied to NPN transistor 27 through resistors 23, 24 and 26 to point of reference or ground potential 2 through resistor 19 to render transistor 27 not conductive. While transistor 27 is not conducting, a positive polarity potential signal, hereinafter referred to for purposes of this specification as a logic 1 signal, is present upon junction 25 and is applied through lead 28, circuit points 28(1) of FIG. 1 and 28(2) of FIG. 2, the FIG. 2 extension of lead 28 and lead 29 to the "a" input terminal of a conventional OR gate 30. In response thereto, OR gate 30 produces a logic 1 output signal that is applied through lead 31, circuits points 21(2) of FIG. 2 and 31(1) of FIG. 1, the FIG. 1 extension of lead 31 and resistor 32 to junction 25A. This logic 1 signal upon junction 25A supplies base-emitter drive current to NPN transistor 33 to render this device conductive through the collector-emitter electrodes thereof. Conducting transistor 33 diverts the base-emitter drive current normally supplied to NPN transistor 34 through resistor 23 and 36 to point of reference or ground potential 2 to render transistor 34 not conductive. With transistor not conducting, the circuit including resistors 23 and 37, the collector-emitter electrodes of transistor 34 and lead 38 through which base-emitter drive current is supplied to control transistor 35 is interrupted to render control transistor 35 not conductive. Control transistor 35 is a silicon planar transistor described in detail in the aforementioned U.S. Pat. No. 3,838,672. Briefly, however, while this transistor is not conducting through the collector-emitter electrodes, current flows through the quasi collector electrode 35A and while this transistor is conducting through the collector-emitter electrodes, substantially no current flows through the quasi collector electrode 35A. Consequently, while control transistor 35 is not conducting through the collector-emitter electrodes, a positive polarity potential signal is present upon junction 40 and while control transistor 35 is conducting through the collector-emitter electrodes, a substantially ground potential signal is present upon junction 40. For purposes of this specification, these signals will hereinafter be referred to as a logic 1 and a logic 0 signal, respectively. The logic 1 signal present upon junction 40 while control transistor 35 is not conducting through the collector-emitter electrodes supplies base-emitter drive current to NPN switching transistor 15 to render this device conductive through the collector-emitter electrodes thereof to complete the previously described energizing circuit for primary winding 7 of ignition coil 6. Later during each same cycle of the timing signals when the potential level of this cycle passes through zero in a negative going direction, NPN transistor 20 is rendered not conductive. With transistor 20 not conductive, base-emitter drive current is supplied through resistors 23, 24 and 26 to NPN transistor 27 to render this device conductive through the collector-emitter electrodes thereof. While transistor 27 is conducting, the signal upon junction 25 decreases in potential magnitude to a level substantially equal to the sum of the saturation voltage of conducting transistor 27 plus the potential drop across resistor 19. For purposes of this specification, this signal will be considered a logic 0 signal that is applied through circuitry previously described to input terminal "a" of OR gate 30 of FIG. 2. As will be brought out later in this specification, while the ignition spark retard circuitry of FIG. 2 is disabled, a logic 0 signal is also present upon input terminal "b" of OR gate 30. In response to these two logic 0 input signals, OR gate 30 produces a logic 0 input signal that is applied through previously described circuitry to junction 25A of FIG. 1. As this logic 0 signal does not supply base-emitter drive current to NPN transistor 33, this transistor is rendered not conductive. While transistor 33 is not conducting, base-emitter drive current is supplied through resistors 23 and 36 to NPN transistor 34 to render this device conductive through the collector-emitter electrodes thereof. While transistor 34 is conducting, base-emitter drive current is supplied through resistors 23 and 37, the collector-emitter electrodes of conducting transistor 34 and lead 38 to control transistor 35. This base-emitter drive current renders control transistor 35 conductive through the collector-emitter electrodes thereof. While control transistor 35 is conducting through the collector-emitter electrodes, substantially no current flows through quasi collector electrode 35A thereof, consequently, a logic 0 signal is present upon junction 40. As this logic 0 signal does not supply base-emitter drive current to NPN switching transistor 15, this device is abruptly rendered not conductive through the collector-emitter electrodes thereof to abruptly interrupt the previously described energizing circuit for primary winding 7 of ignition coil 6. Upon the abrupt interruption of this energizing circuit, an ignition spark potential is induced in secondary winding 8 and is directed through the ignition distributor, not shown, to the spark plug of the engine cylinder to be fired in a manner well known in the automotive art. Therefore, in response to the presence of a logic 1 signal upon junction 25A, the electronic control unit operates in a manner to produce a logic 1 signal upon junction 40 that effects the completion of the previously described energizing circuit for primary winding 7 of ignition coil 6 and in response to the presence of a logic 0 signal upon junction 25A, the electronic control unit operates in a manner to produce a logic 0 signal upon junction 40 that effects the abrupt interruption of the primary winding 7 energizing circuit whereby an ignition spark potential is induced in secondary winding 8 of ignition coil 6. The remainder of the circuitry of FIG. 1 provides dwell time and primary winding 7 energizing current limit capabilities as described in detail in the aforementioned U.S. Pat. No. 3,838,672.

While the associated engine is in the run mode, rotor member 11 of electrical generator assembly 9 is rotated in timed relationship therewith to produce a series of alternating current timing signal waveforms in pickup coil 10, each of which is substantially as illustrated by each of the curves of FIG. 3, in a manner previously described.

During normal operation of the electronic control unit of FIG. 1 in combination with electrical generator assembly 9, the electronic control unit is activated to effect the completion of the ignition coil 6 primary winding 7 energizing circuit during the positive polarity portion of each half cycle of the series of alternating current timing signals induced in pickup coil 10 of electrical generator assembly 9 when the timing signal potential has risen to a level of a sufficient magnitude to render NPN transistor 20 conductive through the collector-emitter electrodes thereof and is activated to effect an ignition spark event by abruptly interrupting the ignition coil 6 primary winding 7 energizing circuit in response to a selected electrical polarity transition of each of the series of alternating current timing signals when the timing signal potential level passes through zero in a negative going direction during the steep negative going portion of each half cycle. The electronic control unit of FIG. 1, therefore, is of the type that effects an ignition spark event in response to a selected electrical polarity transition, positive to negative in the actual embodiment, of each of a series of alternating current timing signals that are induced in the pickup coil of a magnetic distributor electrical generator assembly having at least a rotor member rotated in timed relationship with an associated internal combustion engine.

To provide an ignition spark retard from the normal operation, therefore, it is necessary that the electronic control unit of FIG. 1 be activated to effect an ignition spark event at an engine crankshaft angle later than that at which the ignition spark event would be initiated by the electronic control unit when operating in response to the alternating current timing signals.

The purpose of the circuitry of FIG. 2 is to provide, with the presence of at least one selected engine operating parameter, an ignition spark retard that diminishes substantially linearly in value from maximum to minimum between selected first lower and second higher engine speeds by producing, while the engine is operating between the selected first lower and second higher engine speeds, an output signal of a duration that varies inversely with engine speed and that is effective to override the timing signals produced by electrical generator assembly 9 to effect the interruption of the ignition coil 6 primary winding 7 energizing circuit at an engine crankshaft angle later than that at which it would be interrupted by the electronic control unit of FIG. 1 operating normally in response to the timing signals. In the actual embodiment, the circuitry of FIG. 2 provides a maximum ignition spark retard of ten (10) engine crankshaft degrees for engine speeds between 0 and 1000 RPM that diminishes substantially linearly in value from the maximum ignition spark retard value of ten (10) engine crankshaft degrees to a minimum ignition spark retard value of zero (0) engine crankshaft degrees between the selected first lower 1000 RPM and the second higher 3000 RPM engine speeds, as illustrated by the ignition spark retard curve of FIG. 4. It is to be specifically understood that the ignition spark retard curve of FIG. 4 serves as an example only as any other desirable ignition spark retard curve may be provided without departing from the spirit of the invention.

Figure 5:
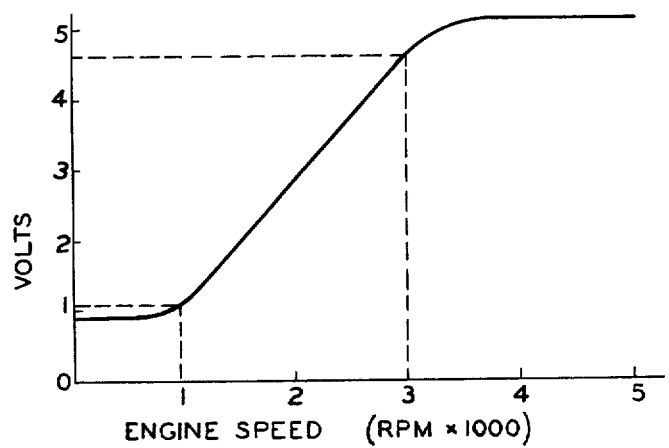

Upon the closure of movable contact 3 of switch 5 of FIG. 1 into electrical circuit closing engagement with stationary contact 4 as shown in the drawing, battery 14 operating potential is supplied to the circuitry of FIG. 1 through positive polarity potential lead 16 and to the circuitry of FIG. 2 through positive polarity potential lead 41, circuit points 41(1) of FIG. 1 and 41(2) of FIG. 2 and the FIG. 2 extension of positive polarity potential lead 41. While the associated internal combustion engine is not running with switch 5 closed, there is present upon junction 45 of FIG. 1 a direct current potential signal of a positive polarity with respect to point of reference or ground potential 2 and of a magnitude equal to the sum of the potential drops across resistor 43 and diode 44. In the actual embodiment, this potential signal is of the order of 0.9 of a volt while the engine is not running. While the engine is in the run mode, capacitor 46 is charged by the half wave rectified alternating current timing signals induced in pickup coil 10 of electrical generator assembly 9. During each positive polarity half cycle of the alternating current timing signals induced in pickup coil 10 while the terminal end 10a thereof is of a positive polarity with respect to terminal end 10b, capacitor 46 charges through a circuit that may be traced from terminal end 10a of pickup coil 10, through resistors 47 and 48, diode 49, resistor 50, capacitor 46, leads 51 and 52, resistor 18, point of reference or ground potential 2, diode 53, resistor 43, lead 54 and resistor 55 to terminal end 10b of pickup coil 10. The charge upon capacitor 46 supplies base-emitter drive current to NPN transistor 56. As the collector-emitter electrodes of transistor 56 are connected, respectively, through lead 57, resistor 23, positive polarity potential lead 16 and the closed contacts of switch 5 to the positive polarity output terminal of battery 14 and through resistor 43, diode 44 and point of reference or ground potential 2 to the negative polarity output terminal of battery 14, this base-emitter drive current renders transistor 56 conductive through the collector-emitter electrodes. While transistor 56 is conductive, the additional current supplied thereby through resistor 43 results in an increased potential drop across resistor 43 that is of a positive polarity upon junction 45 with respect to point of reference or ground potential 2. As has been previously brought out in this specification, as the speed of the associated internal combustion engine increases, the amplitude of the alternating current timing signals induced in pickup coil 10 of electrical generator assembly 9 increases. Consequently, as the speed of the associated internal combustion engine increases, the charge upon capacitor 46 increases to supply an increasing base-emitter drive current to transistor 56. As a result of this increased base-emitter drive current, the collector-emitter conduction of transistor 56 increases to supply more current through resistor 43. This increased current through resistor 43 produces an increased potential drop thereacross of a positive polarity potential upon junction 45 with respect to point of reference or ground potential 2. Therefore, the potential level magnitude of the signal upon junction 45 with respect to point of reference or ground potential 2 increases with engine speed as shown in FIG. 5 wherein the potential level magnitude in volts upon junction 45 with respect to point of reference or ground potential 2 is plotted against engine speed in RPM. In the actual embodiment as shown by the curve of FIG. 5, the potential level magnitude of the signal upon junction 45 with respect to point of reference or ground potential 2 is substantially constant during engine speeds up to a first value, increases substantially linearly in value to a substantially constant maximum value with an increase of engine speed between the first value and a second value and remains at the substantially maximum constant value with engine speeds greater than the second value. This is because of the saturation of transistor 56 and the magnetic circuit of electrical generator assembly 9 at these higher engine speeds. In the actual embodiment, the substantially constant minimum low potential level upon junction 45 with respect to point of reference or ground potential 2 is of the order of 0.9 of a volt with engine speeds up to the order of 750 RPM, increases substantially linearly in value to a maximum potential level of the order of 5.2 volts between engine speeds of the order of 750 RPM and 3750 RPM and remains substantially constant at the maximum potential level of 5.2 volts with engine speeds greater than 3750 RPM. The circuitry just described, therefore, is adapted to be connected to the electrical generator assembly 9 output coil 10 for developing an engine speed potential signal of a magnitude that varies directly with engine speed over an engine speed range between the selected first lower and second higher engine speeds.

This potential signal is applied through lead 59 and circuit points 59(1) of FIG. 1 and 59(2) of FIG. 2 and the FIG. 2 extension of lead 59 to a unity gain amplifier circuit 60. Unity gain amplifier circuit 60 is not absolutely necessary to the circuit of this invention, however it has been included to prevent the circuitry of FIG. 2 from loading down the hereinabove described circuitry of FIG. 1 that produces the potential signal upon junction 45. As amplifier circuit 60 is a unity gain amplifier, the potential signal upon junction 45 also appears upon the output terminal of amplifier circuit 60.

In a manner to be explained in detail later in this specification, the ignition spark retard feature is provided by the timing ramp generator circuitry contained within dashed rectangle 61 by linearly charging and discharging timing capacitor 65 in response to respective charge and discharge currents through respective variable resistors 62 and 63. To insure that at lower engine speeds a sufficient amount of potential is available across respective charge and discharge resistors 62 and 63 for developing the proper ramp currents, a bias potential is developed upon junction 66 of the bias circuit composed of resistor 67, diode 68 and resistor 69. The function of the NPN transistor 70 and resistor 71 combination is to isolate this bias potential from the remainder of the timing ramp generator ciruitry to prevent the remainder of this circuitry from loading down the bias circuitry. As the potential signal upon junction 45 of FIG. 1 also appears upon the output terminal of unity gain amplifier circuit 60 and is applied to junction 64 between diode 68 and resistor 69, the bias potential upon junction 66 will be a function of the potential signal upon junction 45 and will follow a curve similar to that of FIG. 5 except that the voltage axis will be increased by the one diode rise of diode 68. As the potential level upon junction 72 is one PNP transistor 70 emitter-base diode rise higher than that upon junction 66 and the potential level upon each of the emitter electrodes of NPN transistors 73, 74 and 75 is one base-emitter diode drop less than that upon junction 72, the potential level appearing upon the emitter electrode of each NPN transistors 73, 74 and 75 will be substantially equal to the potential upon junction 66. It is this potential level and the resistance values of respective charge and discharge resistors 62 and 63 that determine the charge and discharge rates of timing capacitor 65. The combination of NPN transistor 75 and resistor 76 is an emitter follower circuit that uses the potential signal upon junction 66 as an engine speed variable reference potential that is applied from junction 58 to the plus (+) input terminal of a conventional voltage comparator circuit 77. Voltage comparator circuit 77 is of the type that produces a logic 1 output signal in response to a potential signal applied to the plus (+) input terminal thereof of a magnitude greater than that of a potential signal applied to the minus (−) input terminal thereof and a logic 0 output signal in response to a potential signal applied to the plus (+) input terminal thereof of a magnitude less than that of a potential signal applied to the minus (−) input terminal thereof, as is well known in the art.

To condition the system of this invention for the ignition spark retard operating mode, it is necessary that junction 78 of FIG. 2 be of substantially ground potential to maintain NPN transistor 79 not conductive. This may be accomplished by a control transistor saturation voltage or an electrical switch closure. In the actual embodiment of the system of this invention, the engine speed sensitive variable ignition spark retard feature is operational during the engine operating parameter of an engine operating temperature within the range of 70° F. to 125° F. It is to be specifically understood that any other engine operating parameter may be selected without departing from the spirit of the invention. One method, and without intention or inference of a limitation thereto, for providing a ground potential upon junction 78 with engine temperatures within the range of 70° F. and 125° F. is to have two bimetal switches contained within a suitable enclosure 80 that is mounted in the engine cooling jacket in such a manner that the bimetal switches are in heat transfer relationship with the engine so as to partake of the engine heat. Bimetal reed 81 and stationary contact 82 comprise a pair of normally open contacts and bimetal reed 83 and stationary contact 84 comprise a pair of normally closed contacts with bimetal reed 81 being arranged to operate into electrical circuit completing engagement with stationary contact 82 with engine temperatures of 70° F. and greater and bimetal reed 83 being arranged to operate out of electrical circuit completing engagement with stationary contact 84 with engine temperatures of 125° F. and greater. With this arrangement, junction 78 is connected to point or reference or ground potential 2 upon the operation of bimetal reed 81 into electrical circuit completing engagement with stationary contact 82 when the engine temperature is 70° F. and greater and junction 78 is disconnected from point of reference or ground potential 2 upon the operation of bimetal reed 83 out of electrical circuit completing engagement with stationary contact 84 with engine temperatures of 125° F. and greater.

With engine temperatures within the range of 70° F. and 125° F., bimetal reed 81 is in electrical circuit closed engagement with stationary contact 82 and bimetal reed 83 is in electrical circuit closed engagement with stationary contact 84 to place junction 78 at substantially ground potential. Consequently, NPN transistor 79 is not rendered conductive while the temperature of the associated internal combustion engine is within the range of 70° F. and 125° F. The system of this invention will now be described with regard to the associated engine operating within this selected engine temperature range operating parameter.

Figure 6:
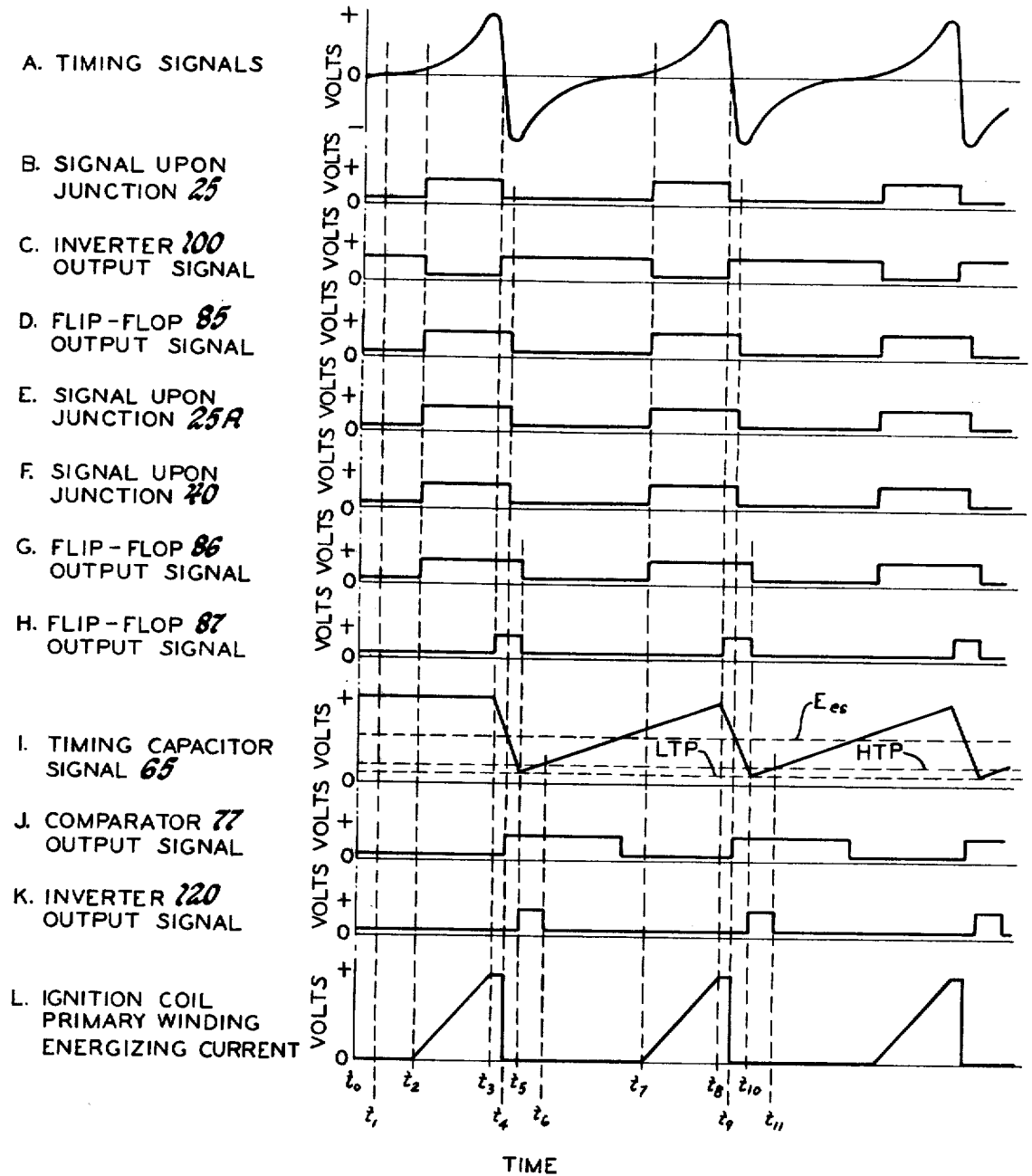

Upon the closure of switch 5 to FIG. 1, battery 14 operating potential is supplied to the circuitry of FIGS. 1 and 2 as previously described. While the associated engine is not in the "Run" mode subsequent to this switch closure, the series of alternating current timing signals is not being induced in pickup coil 10 of electrical generator assembly 9, as indicated by curve A of FIG. 6, wherein $t_o$ denotes a moment of time after switch 5 is closed and before engine crank. In the absence of the alternating current timing signals, transistor 20 of FIG. 1 is not conductive. As previously explained in this specification, while transistor 20 is not conductive, transistor 27 is conductive to place a logic 0 signal upon junctions 25 and 25A, as indicated by respective curves B and E of FIG. 6. As the logic 0 signal upon junction 25 is applied through lead 28, circuit points 28(1) of FIG. 1 and 28(2) of FIG. 2, the FIG. 2 extension of lead 28 and lead 101 to the input terminal of a conventional inverter circuit 100, this signal is inverted to a logic 1 signal, as indicated by curve C of FIG. 6. As previously described in this specification, the electronic control unit of FIG. 1 is responsive to the presence of a logic 0 signal upon junction 25A to produce a logic 0 signal upon junction 40, as indicated by curve F of FIG. 6. By any one of the several methods well known in the art, conventional R-S flip-flop circuits 85, 86 and 87 of FIG. 2 are forced into the operating condition in which a logic 0 signal is present upon the "Q" output terminal of each upon the application of supply potential as indicated by respective curves D, G and H of FIG. 6. The R-S flip-flop circuit is a well known logic circuit element that produces a logic 1 output signal upon the "Q" output terminal upon the application of a logic 1 signal to the "S" input terminal and a logic 0 output signal upon the "Q" output terminal upon the application of a logic 1 signal to the "R" input terminal. The logic 0 signal present upon the "Q" output terminal of R-S flip-flop circuit 87, curve H of FIG. 6, is inverted to a logic 1 signal by a conventional inverter circuit 88. This logic 1 signal supplies base-emitter drive current to NPN transistor 90 to condition this device for conduction through the collector-emitter electrodes thereof. With switch 5 closed, operating potential appears across positive polarity potential lead 41 of FIG. 2 and point of reference or ground potential 2 and, while the engine is not running, a positive polarity potential of the order of 2.3 volts with respect to point of reference or ground potential 2 is present upon junction 72. Consequently, emitter-base drive current is supplied to PNP transistors 91, 92, 93, 94, 95 and 96 and base-emitter drive current is supplied to NPN transistors 73, 74 and 75 to render these devices conductive through the current carrying elements thereof. The PNP transistor 91, 92 and 93 combination comprises a conventional current mirror source circuit arrangement wherein the collector current of NPN transistor 73 is mirrored to the collector electrode of PNP transistor 93. As the collector current of transistor 93 is shunted to point of reference or ground potential 2 through conducting transistor 90, NPN transistor 97 connected as a diode and NPN transistor 98 are not conductive at this time for the reason that the base-emitter drive current therefor is diverted therefrom through conducting transistor 90. Similarly, the combination of PNP transistors 94, 95 and 96 comprises a conventional current mirror source circuit arrangement wherein the collector current of NPN transistor 74 is mirrored to the collector electrode of PNP transistor 96. As transistors 97 and 98 are not conducting, the collector current of transistor 96 charges timing capacitor 65 through leads 103 and 104 to a positive polarity potential, as indicated by curve I of FIG. 6 at time $t_o$. As the charge potential upon timing capacitor 65 is applied to the minus (−) input terminal of voltage comparator circuit 77 and is of a greater positive polarity potential magnitude than is the signal applied to the plus (+) input terminal thereof while the engine is not running, this device produces a logic 0 output signal, as indicated by curve J of FIG. 6. For reasons that will be explained later in this specification, the output signal of a conventional inverter circuit 120 of FIG. 2 is a logic 0, as indicated by curve K of FIG. 6. As a logic 0 signal is present upon junction 40, the primary winding 7 of ignition coil 6 is not energized, as indicated by curve L of FIG. 6.

Upon the initiation of engine crank at time $t_1$ of FIG. 6, the alternating current timing signals begin to be induced in pickup coil 10 of electrical generator assembly 9, as indicated by curve A. When the positive polarity potential level upon terminal end 10a of pickup coil 10 of electrical generator assembly 9 increases to a magnitude sufficient to provide base-emitter drive current to NPN transistor 20 at time $t_2$, this device is rendered conductive through the collector-emitter electrodes as previously described. Upon the conduction of transistor 20, base-emitter drive current is diverted from NPN transistor 27, consequently, this device is rendered not conductive. As previously described, while transistor 27 is not conducting, a logic 1 signal is present upon junction 25, as indicated by curve B of FIG. 6. This logic 1 signal is applied through lead 28 and circuit points 28(1) of FIG. 1 and 28(2) of FIG. 2 and the FIG. 2 extension of lead 28 to the "S" input terminal of R-S flip-flop circuit 85, through lead 29 to the "a" input terminal of conventional OR gate 30, through lead 101 to the input terminal of conventional inverter circuit 100 and through lead 102 to the "S" input terminal of R-S flip-flop circuit 86. This logic 1 signal is: (1) inverted to a logic 0 signal upon the output terminal of inverter circuit 100, as indicated by curve c of FIG. 6, that is applied to the "a" input terminal of each of conventional AND gates 105 and 106; (2) triggers R-S flip-flop circuit 85 to the condition in which a logic 1 ignition spark retard signal is present upon the "Q" output terminal thereof, as indicated by curve D of FIG. 6, that is applied to the "b" input terminal of AND gate 105; (3) triggers R-S flip-flop circuit 86 to the condition in which a logic 1 signal is present upon the "Q" output terminal thereof, as indicated by curve G of FIG. 6, that is applied to the "b" input terminal of AND gate 106; and (4) is gated through OR gate 30 and appears through circuitry previously described as a logic 1 signal upon junction 25A of FIG. 1, as indicated by curve E of FIG. 6. As the logic 0 output signal of inverter circuit 100, curve C of FIG. 6, is applied to the "a" input terminal of each of AND gates 105 and 106, each produces a logic 0 output signal. In a manner previously described in detail, with a logic 1 signal present upon junction 25A, the electronic control unit of FIG. 1 operates to produce a logic 1 signal upon junction 40, as indicated by curve F of FIG. 6. This logic 1 signal supplies base-emitter drive current for NPN switching transistor 15 to render this device conductive through the collector-emitter electrodes thereof. Upon the conduction of switching transistor 15, the previously described energizing circuit for primary winding 7 of ignition coil 6 is completed and, as a consequence, energizing current begins to build up in primary winding 7, as indicated by curve L of FIG. 6.

When the selected electrical polarity transition of the positive polarity half cycle of the alternating current timing signals in a negative going direction occurs at time $t_3$, as indicated by curve A of FIG. 6, transistor 20 of FIG. 1 is rendered not conductive as previously described. Upon transistor 20 going not conductive, base-emitter drive current is supplied to NPN transistor 27 to trigger this device conductive through the collector-emitter electrodes thereof to place a logic 0 signal upon junction 25, as indicated by curve B of FIG. 6. As previously described in detail, while the system of FIG. 1 is operating normally in response to the timing signals induced in pickup coil 10 of electrical generator assembly 9 with the ignition spark retard producing circuitry of FIG. 2 disabled, when transistor 20 is rendered not conductive, a logic 0 signal appears upon junction 25A. With a logic 0 signal present upon junction 25A, the electronic control unit operates in a manner previously described to produce a logic 0 signal upon junction 40. With a logic 0 signal upon junction 40, base-emitter drive current is not supplied to NPN switching transistor 15, consequently, this device is rendered not conductive to abruptly interrupt the previously described energizing circuit for primary winding 7 of ignition coil 6. However, the logic 0 signal appearing upon junction 5 is applied through circuitry previously described to the input terminal of inverter circuit 100 of FIG. 2. This inverter circuit inverts this logic 0 signal to a logic 1 signal upon the output terminal thereof, as indicated by curve C of FIG. 6, that is applied to the "a" input terminal of each of AND gates 105 and 106. As the logic 0 signal now present upon junction 26 does not affect the condition of operation of either of R-S flip-flop circuits 85 or 86, the logic 1 ignition spark retard signal remains upon the "Q" output terminal of R-S flip-flop circuit 85, as indicated by curve D of FIG. 6, and the logic 1 signal remains upon the "Q" output terminal of R-S flip-flop circuit 86, as indicated by curve G of FIG. 6. As AND gate 105 has a logic 1 signal present upon both of the input terminals thereof, this device gates the logic 1 ignition spark retard output signal of R-S flip-flop circuit 85 through to the "b" input terminal of OR gate 30. This device further gates the logic 1 ignition spark retard output signal of R-S flip-flop circuit 85 through to the circuitry of FIG. 1 where it appears as a logic 1 signal upon junction 25A, as indicated by curve E of FIG. 6. With a logic 1 signal present upon junction 25A, the electronic control unit operates in a manner previously described to produce a logic 1 signal upon junction 40, as indicated by curve F of FIG. 6. This logic 1 signal maintains switching transistor 15 conductive, and, consequently, the energizing circuit for primary winding 7 of ignition coil 6 is maintained, as indicated by curve L of FIG. 6. The logic 1 ignition spark retard signal produced by R-S flip-flop circuit 85, therefore, is effective to override the effect of the alternating current timing signals in a manner to delay the occurrence of an ignition spark event. As AND gate 106 also has a logic 1 signal present upon both input terminals thereof, this device produces a logic 1 output signal that is applied to the "S" input terminal of R-S flip-flop circuit 87 to trigger this device to the condition in which a logic 1 signal is present upon the "Q" output terminal thereof, as indicated by curve H of FIG. 6, that is inverted to a logic 0 signal by inverter circuit 88. As this logic 0 signal does not supply base-emitter drive current to NPN transistor 90, this device is rendered not conductive. Upon transistor 90 going not conductive, the collector current of transistor 93 is no longer diverted to point of reference or ground potential 2 but supplies base-emitter drive current for NPN transistors 97 and 98 to render these devices conductive through the current carrying elements thereof.

Simultaneously at this time $t_3$, the engine speed potential signal of a positive polarity potential level magnitude proportional to the engine speed is present upon junction 45 of FIG. 1 and is applied through circuitry previously described to junction 64 of FIG. 2. Also as previously described, the potential level of the signal upon junction 72 is two diode rises, the one diode rise of diode 68 plus the one emitter-base diode rise of transistor 70, higher than the potential level of the engine speed potential signal upon junction 64. The signal present upon junction 72 is (1) reduced by one base-emitter diode drop through NPN transistor 73 and appears upon the emitter electrode thereof and is applied across discharge resistor 63; is (2) reduced by one base-emitter diode drop through NPN transistor 74 and appears upon the emitter electrode thereof and is applied across charge resistor 62; and is (3) reduced by one base-emitter diode drop through NPN transistor 75 and appears upon junction 58 as an engine speed variable reference potential signal ($E_{es}$) that is applied to the plus (+) input terminal of voltage comparator circuit 77. Consequently, the potential upon the emitter electrode of each of transistors 73 and 74 and the engine speed variable reference potential signal ($E_{es}$) upon junction 58 varies in potential level magnitude as the engine speed potential signal upon junction 45 of FIG. 1 varies in potential level magnitude with engine speed and is of a potential level magnitude substantially one diode rise higher than that of the engine speed potential signal upon junction 45. As the potential level magnitude of the engine speed potential signal upon junction 25 varies directly with the timing signal amplitude as hereinabove explained, the engine speed variable reference potential signal upon junction 58 is a function of the amplitude of the timing signals.

While conducting, the combination of NPN transistor 97 connected as a diode and NPN transistor 98 comprises a current mirror sink circuit arrangement that sinks the collector current of transistor 96 to point of reference or ground potential 2. Therefore, upon transistor 90 going not conductive, this current mirror sink circuit arrangement is activated. The collected current of transistor 73 is mirrored to the collector electrode of transistor 93 that becomes the diode current of transistor 97 connected as a diode. As transistors 97 and 98 comprise a current mirror sink circuit arrangement, the diode current of transistor 97 is mirrored to the collector electrode of transistor 98. Therefore, the amount of current that the current mirror sink circuit arrangement sinks to point of reference or ground potential 2 is equal to the collector current of transistor 73 that is determined by the potential level upon the emitter electrode thereof and the resistance value of discharge resistor 63. As the collector current of transistor 74 is mirrored to the collector electrode of transistor 96, the amount of current that transistor 96 may supply is equal to the collector current of transistor 74 that is determined by the potential level magnitude upon the emitter electrode thereof and the resistance value of charge resistor 62. For reasons to be explained later in this specification, the resistance value of charge resistor 62 is much greater than the resistance value of discharge resistor 63. Consequently, the collector current of transistor 74 that is mirrored to the collector electrode of transistor 96 is less than that mirrored to the collector electrode of transistor 93 from the collector electrode of transistor 73. This difference in current values is made up as a discharge current from timing capacitor 65 that begins to discharge linearly in a negative going ramp at a rate determined by the resistance value of discharge resistor 63, as indicated by curve I of FIG. 6.

When timing capacitor 65 has discharged to a potential level substantially equal to that of the engine speed variable reference potential signal ($E_{es}$) present upon junction 58 at time $t_4$ of FIG. 6, comparator circuit 77 switches to the condition in which a logic 1 signal is present upon the output terminal thereof, as indicated by curve J of FIG. 6, that is applied through lead 112 to the "R" input terminal of R-S flip-flop circuit 85. This logic 1 signal triggers R-S flip-flop circuit 85 to the condition in which a logic 0 signal is present upon the ")" output terminal thereof to terminate the logic 1 ignition spark retard signal, as indicated by curve D of FIG. 6. As this logic 0 output signal upon the "Q" output terminal of R-S flip-flop circuit 85 is applied to the "b" input terminal of AND gate 105, this device produces a logic 0 output signal that is applied to the "b" input terminal of OR gate 30. As the logic 0 signal present upon junction 25, curve B of FIG. 6, is applied to the "a" input terminal of OR gate 30, this device produces a logic 0 output signal that is applied through circuitry previously described to the circuitry of FIG. 1 and appears as a logic 0 signal upon junction 25A, as indicated by curve E of FIG. 6. In a manner previously described in detail, with a logic 0 signal present upon junction 25A, the electronic control unit of FIG. 1 operates to produce a logic 0 signal upon junction 40, as indicated by curve F of FIG. 6. As this logic 0 signal does not supply base-emitter drive current to NPN switching transistor 15, this device is rendered not conductive to abruptly interrupt the previously described energizing circuit for primary winding 7 of ignition coil 6, as indicated by curve L of FIG. 6, to induce an ignition spark potential in seconary winding 8. Therefore, while the circuitry of FIG. 2 is enabled, the ignition spark is retarded during the period between times $t_3$ and $t_4$ of FIG. 6. From this discussion, therefore, it is apparent that R-S flip-flop circuit 85 is responsive to each of the series of alternating current timing signals induced in pickup coil 10 of electrical generator assembly 9 for producing during the half cycle thereof immediately preceding the selected electrical transition an ignition spark retard signal, curve D of FIG. 6, that is effective to override the effect of the alternating current timing signals in a manner to delay the occurrence of an ignition spark event.

As timing capacitor 65 continues to further discharge linearly in the same direction, at time $t_5$ of FIG. 6, the charge thereupon has decreased to the low trigger point (LTP) of a conventional Schmitt trigger circuit 115 to trigger this device to the condition in which a logic 0 signal is present upon the output terminal thereof that is applied through lead 116 to the input terminal of a conventional inverter circuit 120. This logic 0 signal is inverted by inverter circuit 120 to a logic 1 signal upon lead 121, as indicated by curve K of FIG. 6, that is applied to the "R" input terminal of each of R-S flip-flop circuits 86 and 87 to trigger these devices to the condition in which a logic 0 signal is present upon the "Q" output terminal of each, as indicated by respective curves G and H of FIG. 6. The logic 0 output signal of R-S flip-flop circuit 87 is inverted by inverter circuit 88 to a logic 1 output signal that supplies base-emitter drive current to NPN transistor 90. This base-emitter drive current triggers transistor 90 conductive through the collector-emitter electrodes thereof to divert the collector current of PNP transistor 93 to point of reference or ground potential 2.

Upon the conduction of transistor 90, therefore, the collector current of transistor 93 is diverted therethrough to point of reference or ground potential 2 to render trasistors 97 and 98 of the current mirror sink circuit arrangement not conductive to thereby deactivate this current mirror sink circuit arrangement. As previously described, while transistors 97 and 98 are not conductive, the collector current of transistor 96 charges timing capacitor 65 through leads 103 and 104.

As the collector current of transistor 74 is mirrored to the collector electrode of transistor 96 and since the collector current of transistor 74 is determined by the potential level upon the emitter electrode thereof and the resistance value of charge resistor 62, timing capacitor 65 charges linearly in a positive going ramp at a rate determined by the potential level upon the emitter electrode of transistor 74 and the resistance value of charge resistor 62, as indicated by curve I of FIG. 6.

At time $t_6$ when the charge upon timing capacitor 65, applied through lead 104 to Schmitt trigger circuit 115, has increased to a potential level equal to the selected high trigger point (HTP) of Schmitt trigger circuit 115, this device switches to the condition in which a logic 1 signal is present upon the output terminal thereof. This logic 1 signal is applied through lead 116 to the input terminal of conventional inverter circuit 120. Inverter circuit 120 inverts this logic 1 signal to a logic 0 signal, as indicated by curve K of FIG. 6, that is applied to the "R" input terminal of each of R-S flip-flop circuits 86 and 87. At this time, therefore, the circuitry of FIG. 2 is conditioned for operation in response to the next timing signal cycle.

When the positive polarity potential level upon terminal end 10a of pickup coil 10 of electrical generator assembly 9 next increases to a magnitude sufficient to provide base-emitter drive current to NPN transistor 20 at time $t_7$ of FIG. 6, this device is rendered conductive through the collector-emitter electrodes as previously described. Upon the conduction of transistor 20, base-emitter drive current is diverted from NPN transistor 27, consequently, this device is rendered not conductive. As previously described, while transistor 27 is not conducting, a logic 1 signal is present upon conjunction 25, as indicated by curve B of FIG. 6. This logic 1 signal is applied through circuitry previously explained to the "S" input terminal of R-S flip-flop circuit 85, through lead 29 to the "a" input terminal of conventional OR gate 30, through lead 101 to the input terminal of conventional converter circuit 100 and through lead 102 to the "S" input terminal of R-S flip-flop circuit 86. This logic 1 signal (1) is inverted to a logic 0 signal upon the output terminal of inverter circuit 100, as indicated by curve C of FIG. 6, that is applied to the "a" input terminal of each of conventional AND gates 105 and 106; (2) triggers R-S flip-flop circuit 85 to the condition in which the logic 1 ignition spark retard signal is present upon the "Q" output terminal thereof, as indicated by curve B of FIG. 6, that is applied to the "b" input terminal of AND gate 105; (3) triggers R-S flip-flop circuit 86 to the condition in which a logic 1 signal is present upon the "Q" output terminal thereof, as indicated by curve G of FIG. 6 that is applied to the "b" input terminal of AND gate 106 and (4) is gated through OR gate 30 and appears through circuitry previously described as a logic 1 signal upon junction 25A of FIG. 1 as indicated by curve E of FIG. 6. As the logic 0 output signal of inverter circuit 100, curve C of FIG. 6, is applied to the "a" input terminal of each of AND gates 105 and 106, each produces a logic 0 output signal. In a manner previously described in detail, with a logic 1 signal present upon junction 25A, the electronic control unit of FIG. 1 operates to produce a logic 1 signal upon junction 40, as indicated by curve F of FIG. 6. This logic 1 signal supplies base-emitter drive current for NPN switching transistor 15 to render this device conductive through the collector-emitter electrodes thereof. Upon the conduction of switching transistor 15, the previously described energizing circuit for primary winding 7 of ignition coil 6 is completed and, as a consequence, energizing current begins to build up in primary winding 7, as indicated by curve L of FIG. 6. In the meantime, timing capacitor 65 continues to charge linearly in a positive going ramp, as indicated by curve I of FIG. 6.

When the selected polarity transition of this half cycle of the alternating current timing signal in a negative going direction occurs at the time $t_8$, as indicated by curve A of FIG. 6, transistor 20 of FIG. 1 is rendered not conductive as previously described. Upon transistor 20 going not conductive, base-emitter drive current is supplied to NPN transistor 27 as previously described to trigger this device conductive through the collector-emitter electrodes thereof to place a logic 0 signal upon junction 25, as indicated by curve B of FIG. 6. This logic 0 signal upon junction 25 is applied through circuitry previously described to the input terminal of inverter circuit 100 of FIG. 2. This inverter circuit inverts this logic 0 signal to a logic 1 signal upon the output terminal thereof, as indicated by curve C of FIG. 6, that is applied to the "a" input terminal of each of AND gates 105 and 106. As this logic 0 signal now present upon junction 25 does not affect the condition of operation of either of R-S flip-flop circuits 85 or 86, the logic 1 ignition spark retard signal remains upon the "Q" output terminal of R-S flip-flop circuit 85, as indicated by curve D of FIG. 6 and the logic 1 signal remains upon the "Q" output terminal of R-S flip-flop circuit 86, as indicated by curve G of FIG. 6. As AND gate 105 has a logic 1 signal present upon both of the input terminals thereof, this device gates the logic 1 ignition spark retard output signal of R-S flip-flop circuit 85 through to the "b" input terminal of OR gate 30. This device further gates the logic 1 ignition spark retard output signal of R-S flip-flop circuit 85 through to the circuitry of FIG. 1 where it appears as a logic 1 signal upon junction 25A, as indicated by curve E of FIG. 6. With a logic 1 signal present upon junction 25A, the electronic control unit operates in a manner previously described to produce a logic 1 signal upon junction 40, as indicated by curve F of FIG. 6. This logic 1 signal maintains switching transistor 15 conductive and, consequently, the energizing circuit for primary winding 7 of ignition coil 6 is maintained, as indicated by curve L of FIG. 6. The logic 1 ignition spark retard signal produced by R-S flip-flop circuit 85, therefore, is effective to override the effect of the alternating current timing signals in a manner to delay the occurrence of an ignition spark event. As AND gate 106 also has a logic 1 signal present upon both input terminals thereof, this device produces a logic 1 output signal that is applied to the "S" input terminal of R-S flip-flop circuit 87 to trigger this device to the condition in which a logic 1 signal is present upon the "Q" output terminal thereof, as indicated by curve H of FIG. 6, that is inverted to a logic 0 signal by inverter circuit 88. As this logic 0 signal does not supply base-emitter drive current to NPN transistor 90, this device is rendered not conductive. Upon transistor 90 going not conductive, the collector current of transistor 93 is no longer diverted to point of reference or ground potential 2 but supplies base-emitter drive current for NPN transistors 97 and 98 of the current mirror sink circuit arrangement to render these devices conductive through the current carrying elements thereof. When transistor 90 is rendered not conductive, therefore, the previously described current mirror sink circuit arrangement is activated. Upon the activation of the current mirror sink circuit arrangement, the circuitry of FIG. 2 operates in a manner previously explained to discharge timing capacitor 65 in a negative going ramp as indicated by curve I of FIG. 6. That is, the circuitry of FIG. 2 including inverter circuit 100, AND gate 106, R-S flip-flop circuit 87, inverter circuit 88, and transistor 90 is responsive to this selected polarity transition of the alternating current timing signals at time $t_8$ of FIG. 6 to activate the current mirror sink circuit arrangement and thereby effect the initiation of the discharge of timing capacitor 65.

Upon the initiation of the discharge of timing capacitor 65, the timing ramp generator circuitry contained within dashed rectangle 61 of FIG. 2 discharges timing capacitor 65 substantially linearly in a negative going ramp, as indicated by curve I of FIG. 6, in a manner previously explained in detail. When timing capacitor 65 has discharged to a potential level substantially equal to that of the engine speed variable reference signal ($E_{es}$) present upon junction 58 at time $t_9$ of FIG. 6, comparator circuit 77 switches to the condition in which a logic 1 signal is present upon the output terminal thereof, as indicated by curve J of FIG. 6, that is applied through lead 112 to the "R" input terminal of R-S flip-flop circuit 85. This logic 1 signal triggers R-S flip-flop circuit 85 to the condition in which a logic 0 signal is present upon the "Q" output terminal thereof to terminate the logic 1 ignition spark retard signal, as indicated by curve D of FIG. 6. As this logic 0 output signal upon the "Q" output terminal of R-S flip-flop circuit 85 is applied to the "b" input terminal of AND gate 105, this device produces a logic 0 output signal that is applied to the "b" input terminal of OR gate 30. As the logic 0 signal present upon junction 25, curve B of FIG. 6, is applied to the "a" input terminal of OR gate 30, this device produces a logic 0 output signal that is applied through circuitry previously described to the circuitry of FIG. 1 and appears as a logic 0 signal upon junction 25A, as indicated by curve E of FIG. 6. In a manner previously described in detail, with a logic 0 signal present upon junction 25A, the electronic control unit of FIG. 1 operates to produce a logic 0 signal upon junction 40, as indicated by curve F of FIG. 6. As this logic 0 signal does not supply base-emitter drive current to NPN switching transistor 15, this device is rendered not conductive to abruptly interrupt the previously described energizing circuit for primary winding 7 of ignition coil 6, as indicated by curve L of FIG. 6, to induce an ignition spark potential in secondary winding 8. Therefore, while the circuitry of FIG. 2 is enabled, the ignition spark is retarded during the period between times $t_8$ and $t_9$ of FIG. 6.

As hereinabove described in detail, while the ignition spark retard producing circuitry of FIG. 2 is enabled, an ignition spark event is initiated when timing capacitor 65 has discharged to a potential level substantially equal to that of the engine speed variable reference potential signal present upon junction 58. The substantially linear negative going discharge ramp of timing capacitor 65, therefore, is a variable ignition spark retard value determining electrical signal that varies substantially linearly in potential level magnitude with time and, consequently, a given variation in voltage level magnitude of this signal substantially represents an ignition spark event retard value in engine crankshaft degrees.

As timing capacitor 65 continues to further discharge linearly in the same direction, at time $t_{10}$ of FIG. 6, the charge thereupon has decreased to the low trigger point (LTP) of conventional Schmitt trigger circuit 115 to trigger this device to the condition in which a logic 0 signal is present upon the output terminal thereof that is applied through lead 116 to the input terminal of conventional inverter circuit 120. This logic 0 signal is inverted by inverter circuit 120 to a logic 1 signal upon lead 121, as indicated by curve K of FIG. 6, that is applied to the "R" input terminal of each of R-S flip-flop circuits 86 and 87 to trigger these devices to the condition in which a logic 0 signal is present upon the "Q" output terminal of each as indicated by respective curves G and H of FIG. 6. The logic 0 output signal of R-S flip-flop circuit 87 is inverted by inverter circuit 88 to a logic 1 output signal that supplies base-emitter drive current to NPN transistor 90. This base-emitter drive current triggers transistor 90 conductive through the collector-emitter electrodes thereof to divert the collector current of PNP transistor 93 to point of reference or ground potential 2.

Upon the conduction of transistor 90, therefore, the collector current of transistor 93 is diverted therethrough to point of referrence or ground potential 2 to render transistors 97 and 98 of the current mirror sink circuit arrangement not conductive. When transistor 90 is rendered conductive, therefore, the previously described current mirror sink circuit arrangement is deactivated. Upon the deactivation of the current mirror sink circuit arrangement, the circuitry of FIG. 2 operates in a manner previously explained to charge timing capacitor 65 in a positive going ramp, as indicated by curve I of FIG. 6. That is, the circuitry of FIG. 2 including Schmitt trigger circuit 115, inverter circuit 120, R-S flip-flop circuit 87, inverter circuit 88 and transistor 90 is responsive to the further variation of the variable ignition spark retard determining signal in the same direction to another different potential level of a selected magnitude for deactivating the current mirror sink circuit arrangement whereby the current mirror source circuit arrangement previously described charges timing capacitor 65 in a positive going ramp to condition the system for the initiation of another variable ignition spark retard determining signal upon the next selected electrical polarity transition of the alternating current timing signals.

At time $t_{11}$ when the charge upon timing capacitor 65, applied through lead 104 to Schmitt trigger circuit 115, has increased to a potential level equal to the selected high trigger point (HTP) of Schmitt trigger 115, this device switches to the condition in which a logic 1 signal is present upon the output terminal thereof. This logic 1 signal is applied through lead 116 to the input terminal of conventional inverter circuit 120. Inverter circuit 120 inverts this logic 1 signal to a logic 0 signal, as indicated by curve K of FIG. 6, that is applied to the "R" input terminal of each of R-S flip-flop circuits 86 and 87. At this time, therefore, the circuitry of FIG. 2 is prepared to operate in response to the next timing signal cycle.

While the ignition spark retard producing circuitry of FIG. 2 is enabled, an ignition spark event is initiated when the potential level of the variable ignition spark retard value determining signal, the negative going discharge ramp potential signal of timing capacitor 65, is substantially equal to that of the engine speed variable reference potential signal, the signal present upon junction 58. As the negative going timing capacitor 65 discharge ramp signal is the variable ignition spark retard value determining signal, the potential level of this signal must reduce in value until it is of a potential level substantially equal to that of the engine speed variable reference potential signal upon junction 58. Since the potential level of the engine speed variable reference potential signal varies directly with engine speed, the potential level of the engine speed variable reference potential signal increases with engine speed. As an ignition spark event is initiated when the potential level of the variable ignition spark retard value determining signal has reduced to a potential level substantially equal to that of the engine speed variable reference potential signal, the ignition spark retard value diminishes substantially linearly in value from maximum to minimum as the engine speed increases from the first lower and second higher engine speeds for the reason that, as the potential level of the engine speed variable reference potential signal increases, the potential level of the variable ignition spark retard value determining signal reduces to a value substantially equal thereto earlier after the initiation thereof at the selected electrical polarity transition of each of the series of alternating current timing signals. Therefore, as the engine speed increases, the engine speed ignition spark retard value diminishes along the timing capacitor 65 discharge ramp, the higher the engine speed the earlier after the discharge of timing capacitor 65 has been initiated that the ignition spark is effected. Therefore, any given variation in potential level magnitude of the variable ignition spark retard value determining signal, the discharge ramp of timing capacitor 65, substantially represents an ignition spark event retard value in engine crankshaft degrees.

When the engine is operating at the speed equal to and greater than the selected second higher engine speed, the potential level of the engine speed variable reference potential signal is always greater than the maximum potential level of the variable ignition spark retard value determining signal. Consequently, with engine speeds equal to and greater than the selected maximum value, the output signal of comparator circuit 77 remains a logic 1 to maintain R-S flip-flop circuit 85 in the condition in which a logic 0 signal is present upon the "Q" output terminal thereof. Under these conditions, therefore, R-S flip-flop circuit 85 is prevented from producing the logic 1 ignition spark retard signal. As a consequence, at these engine speeds greater than the selected maximum, the ignition spark retard producing circuitry of FIG. 2 is maintained disabled.

As the ignition spark retard producing circuitry of FIG. 2 must be disabled with engine speeds equal to and greater than the selected maximum engine speed value, it is necessary that comparator circuit 77 be maintained in the condition in which a logic 1 signal is present upon the output terminal thereof while the engine is operating at speeds equal to and greater than the selected maximum. Therefore, the potential level of the engine speed variable reference potential signal upon junction 58 must be at least equal to the charge potential level upon timing capacitor 65 with engine speeds equal to and greater than the selected maximum. Additionally, the resistance values of charge and discharge resistors 62 and 63, respectively, are dictated by the maximum ignition spark retard value required. In the actual embodiment, the selected maximum engine speed is 3000 RPM and the maximum engine speed retard value desired is 10 engine crankshaft degrees; therefore, these values will be employed for purposes of this specification.

Figure 4:
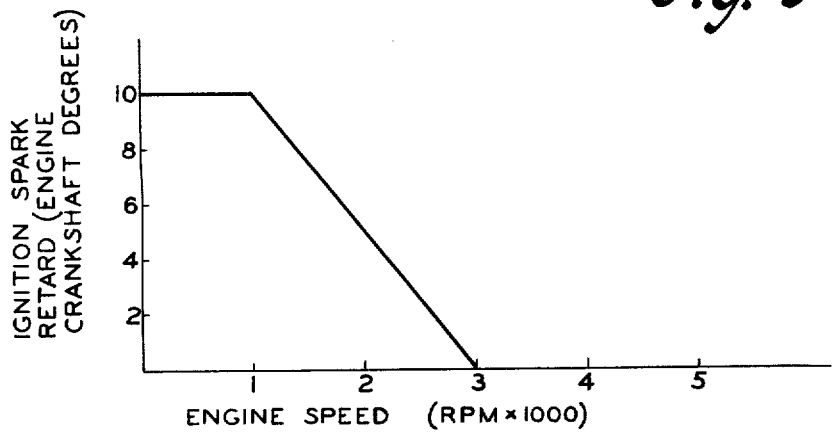

With an 8-cylinder engine, there are 90 engine crankshaft degrees between times $t_5$ and $t_{10}$ of FIG. 6, consequently, timing capacitor 65 must discharge during the last one-ninth of this period (10°/90°) which is the period between times $t_8$ and $t_{10}$. Referring to FIG. 4, the engine speed potential signal upon junction 45 of FIG. 1 in the actual embodiment is of the order of 4.7 volts at 3000 engine RPM. As the diode rise across diode 68 in the actual embodiment is 0.7 of a volt, the engine speed variable reference potential signal upon junction 58 is of the order of 5.4 volts. Therefore, timing capacitor 65 should charge to a maximum potential level of the order of 5.4 volts between times $t_5$ and $t_8$ of FIG. 6 and discharge to a substantially zero level between times $t_8$ and $t_{10}$. With this maximum charge potential level value of timing capacitor 65, the engine speed variable reference potential signal upon junction 58 is at least equal to and is greater than this timing capacitor 65 charge potential level value with engine speeds equal to and greater than the selected maximum of 3000 RPM. In the actual embodiment, (1) the selected minimum engine speed is 1000 RPM, (2) the engine speed potential signal upon junction 45 at 1000 engine RPM is 1.1 volt as indicated by the curve of FIG. 4, (3) the engine speed variable reference potential signal 58 at 1000 engine RPM is 1.8 volts (1.1 volts+0.7 of a volt diode 68 rise), (4) the period between times $t_5$ and $t_{10}$ of FIG. 6 at 1000 engine RPM is 15 milliseconds (60 seconds/1000 RPM×90°/360°) and (5) the capacitance value of timing cpacitor 65 is 0.047 microfarads.

The charge/discharge equation for timing capacitor 65 is:

$$I + C(dv/dt)$$

As has been previously brought out in this specification, the charge current of timing capacitor 65 is determined by the potential level magnitude upon the emitter electrode of transistor 74 and the resistance value of charge resistor 62 and the discharge current of timing capacitor 65 is determined by the potential level magnitude upon the emitter electrode of transistor 73 and the resistance value of discharge resistor 63. As the potential level magnitude upon the emitter electrode of each of transistors 73 and 74 and the potential level magnitude upon junction 58 are one diode rise higher than the engine speed potential signal, the potential level magnitude upon the emitter electrode of each of transistors 73 and 74 is substantially equal to the engine speed variable reference potential signal $E_{es}$ upon junction 58. Therefore, the charge current for timing capacitor 65 is equal to the engine speed variable reference potential signal $E_{es}$ divided by the resistance value $R_{62}$ of charge resistor 62 and the discharge current of timing capacitor 65 is equal to the engine speed variable potential reference signal $E_{es}$ divided by the resistance value $R_{63}$ of discharge resistor 63. The charge equation for charging capacitor 65, therefore, may be represented as:

$$E_{es}/R_{62} = C(dv/dt)$$

and the discharge equation for discharging capacitor 65 may be represented as:

$$E_{es}/R_{63} = C(dv/dt)$$

Therefore, the resistance value $R_{62}$ of charge resistor 62 and the resistance value $R_{63}$ of discharge resistor 63 may be calculated by the respective equations:

$$R_{62} = E_{es} dt_{charge}/C\, dv$$

$$R_{63} = E_{es} dt_{discharge}/C\, dv$$

In the charge resistor 62 resistance value equation, $E_{es}$ is the potential level magnitude of the engine speed variable reference potential signal at 1000 engine RPM, dt is the charge time of timing capacitor 65 which is 8/9 of the period between times $t_5$ and $t_{10}$ of FIG. 6 or 13.33 milliseconds (15 milliseconds×8/9), dv is the selected maximum potential level to which timing capacitor 65 is to be charged or 5.4 volts and C is the capacitance value of timing capacitor 65 or 0.047 microfarads.

Substituting these values in the equation for determining the resistance value $R_{62}$ of charge resistor 62:

$$R_{62} = (1.8 \times 13.33)/(0.047 \times 5.4) = 94.5 \text{ kilohms}$$

In the discharge resistor 63 resistance value equation, $E_{es}$ is the potential level magnitude of the engine speed variable reference potential signal at 1000 engine RPM, dt is the discharge time of timing capacitor 65 which is 1/9 of the period between times $t_5$ and $t_{10}$ of FIG. 6 or 1.66 milliseconds (15 milliseconds×1/9), dv is the selected maximum potential level to which timing capacitor 65 is to be charged or 5.4 volts and C is the capacitance value of timing capacitor 65.

Substituting these values in the equation for calculating the resistance value $R_{63}$ of discharge resistor 63:

$$R_{63} = (1.8 \times 1.66)/(0.047 \times 5.4) = 11.8 \text{ kilohms}$$

As the discharge time dt of timing capacitor 65 is ⅛ the charge time, the resistance value of charge resistor 62 is much greater, of the order of eight times, than that of the discharge resistor 63.

Briefly summarizing the internal combustion engine electronic ignition system combination of this invention:

1. R-S flip-flop circuit 85 is responsive to each of the series of alternating current timing signals for producing during the half cycle thereof immediately preceding the selected electrical polarity transition an ignition spark retard signal that is effective to override the effect of the alternating current timing signals in a manner to delay the occurrence of an ignition spark event;

2. Inverter circuit 100, AND gate 106, R-S flip-flop circuit 87, inverter circuit 88 and transistor 90 are responsive to each selected electrical polarity transition of the alternating current timing signals for initiating the production of a variable ignition spark retard value determining electrical signal, the negative going discharge ramp of timing capacitor 65, that varies substantially linearly in potential level magnitude with time in such a manner that a given variation in potential level magnitude of this signal substantially represents an ignition spark event retard value in engine crankshaft degrees;

3. Comparator circuit 77 is responsive to the variable ignition spark retard value determining signal, the negative going discharge ramp of charging capacitor 65, and the potential level of the engine speed variable reference potential signal upon junction 58 for terminating the ignition spark retard output signal produced by R-S flip-flop circuit 85 when the variable ignition spark retard value determining signal varies to a potential level magnitude substantially equal to that of the engine speed variable reference potential signal to thereby effect an ignition spark event; and 4. Schmitt trigger circuit 115, inverter circuit 120, R-S flip-flop circuit 87, inverter circuit 88 and transistor 90 are responsive to the further variation of the variable ignition spark retard determining signal, the negative discharge ramp of timing capacitor 65, in the same direction to another different potential level of a selected magnitude for effecting a substantially linear opposite direction variation of voltage level thereof with time.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is claimed are defined as follows:

1. An internal combustion engine electronic ignition system having an engine speed sensitive variable ignition spark retard feature that is operational only during the presence of at least one selected engine operating parameter to provide an ignition spark retard that diminishes substantially linearly in value from maximum to minimum between selected first lower and second higher engine speeds and being of the type that effects an ignition spark event in response to a selected electrical polarity transition of each of a series of alternating current timing signals that are induced in the pickup coil of an electrical generator assembly having a rotor member rotated in timed relationship with the engine, comprising:

means responsive to each of said series of alternating current timing signals for producing during the half cycle thereof immediately preceding said selected electrical polarity transition an ignition spark retard signal that is effective to override the effect of said alternating current timing signals in a manner to delay the occurrence of an ignition spark event;

means responsive to each said selected electrical polarity transition of said alternating current timing signals for initiating the production of a variable ignition spark retard value determining electrical signal that varies substantially linearly in potential level magnitude with time and wherein a given variation in potential level magnitude substantially represents an ignition spark event retard value in engine crankshaft degrees;

means for producing an engine speed variable reference potential signal that is a function of the amplitude of said timing signals and that varies directly with engine speed over an engine speed range between said selected first lower and second higher speeds; and means responsive to said variable ignition spark retard value determining signals and said engine speed variable reference potential signal for terminating said ignition spark retard signal when said variable ignition spark retard value determining signal varies to a potential level magnitude substantially equal to that of said engine speed variable reference potential signal to thereby effect an ignition spark event, the variation in magnitude of said engine speed variable reference potential signal and said ignition spark retard determining signal being such that the amount of ignition retard decreases substantially linearly with increasing engine speed between said first and second selected engine speeds.

2. An internal combustion engine electronic ignition system having an engine speed sensitive variable ignition spark retard feature that is operational only during the presence of at least one selected engine operating parameter to provide an ignition spark retard that diminishes substantially linearly in value from maximum to minimum between selected first lower and second higher engine speeds and being of the type that effects an ignition spark event in response to a selected electrical polarity transition of each of a series of alternating current timing signals that are induced in the pickup coil of an electrical generator assembly having a rotor member rotated in timed relationship with the engine, comprising:

means responsive to each of said series of alternating current timing signals for producing during the half cycle thereof immediately preceding said selected electrical polarity transition an ignition spark retard signal that is effective to override the effect of said alternating current timing signals in a manner to delay the occurrence of an ignition spark event;

means responsive to each said selected electrical polarity transition of said alternating current timing signals for initiating the production of a variable ignition spark retard value determining electrical signal that varies substantially linearly in potential level magnitude with time and wherein a given variation in potential level magnitude substantially represents an ignition spark event retard value in engine crankshaft degrees;

means for producing an engine speed variable reference potential signal that is a function of the amplitude of said timing signals and that varies directly with engine speed over an engine speed range between said selected first lower and second higher speeds;

means responsive to said variable ignition spark retard value determining signal and said engine speed variable reference potential signal for terminating said ignition spark retard output signal when said variable ignition spark retard value determining signal varies to a potential level magnitude substantially equal to that of said engine speed variable reference potential signal to thereby effect an ignition spark event, the variation in magnitude of said engine speed variable reference potential signal and said ignition spark retard determining signal being such that the amount of ignition retard decreases substantially linearly with increasing engine speed between said first and second selected engine speeds; and means responsive to the further variation of said variable ignition spark retard value determining signal in the same direction to another different potential level of a selected magnitude for effecting a substantially linear opposite direction variation of potential level thereof with time.

3. An internal combustion engine electronic ignition system having an engine speed sensitive variable ignition spark retard feature that is operational only during the presence of at least one selected engine operating parameter to provide an ignition spark retard that diminishes substantially linearly in value from maximum to minimum between selected first lower and second higher engine speeds and being of the type that effects an ignition spark event in response to a selected electrical polarity transition of each of a series of alternating current timing signals that are induced in the pickup coil of an electrical generator assembly having a rotor member rotated in timed relationship with the engine, comprising:

means responsive to each of said series of alternating current timing signals for producing during the half cycle thereof immediately preceding said selected electrical polarity transition an ignition spark retard signal that is effective to override the effect of said alternating current timing signals in a manner to delay the occurrence of an ignition spark event;

means for producing a variable electrical signal of the type that is substantially linearly variable in potential level magnitude with time in each of two opposite directions;

means responsive to each said selected electrical polarity transition of said alternating current timing signals for effecting a variation of the potential level of said variable electrical signal in a selected first direction to produce a variable ignition spark retard value determining electrical signal that varies substantially linearly in potential level magnitude with time and wherein a given variation in potential level magnitude substantially represents an ignition spark event retard value in engine crankshaft degrees;

means for producing an engine speed variable reference potential signal that is a function of the amplitude of said timing signals and that varies directly with engine speed over an engine speed range between said selected first lower and second higher speeds;

means responsive to said variable ignition spark retard value determining signal and said engine speed variable reference potential signal for terminating said ignition spark retard output signal when said variable ignition spark retard value determining signal varies to a potential level magnitude substantially equal to that of said engine speed variable reference potential signal to thereby effect an ignition spark event, the variation in magnitude of said engine speed variable reference potential signal and said ignition spark retard determining signal being such that the amount of ignition retard decreases substantially linearly with increasing engine speed between said first and second selected engine speeds; and means responsive to the further variation of said electrical signal in the same direction to another different potential level of a selected magnitude for effecting a substantially linear opposite direction variation of potential level thereof with time.

4. An internal combustion engine electronic ignition system having an engine speed sensitive variable ignition spark retard feature that is operational only during the presence of at least one selected engine operating parameter to provide an ignition spark retard that diminishes substantially linearly in value from maximum to minimum between selected first lower and second higher engine speeds and being of the type that effects an ignition spark event in response to a selected electrical polarity transition of each of a series of alternating current timing signals that are induced in the pickup coil of an electrical generator assembly having a rotor member rotated in timed relationship with the engine, comprising:

means responsive to each of said series of alternating current timing signals for producing during the half cycle thereof immediately preceding said selected electrical polarity transition an ignition spark retard signal that is effective to override the effect of said alternating current timing signals in a manner to delay the occurrence of an ignition spark event;

a capacitor;

a current mirror source circuit arrangement capable of charging said capacitor upon and during the application of operating potential;

a current mirror sink circuit arrangement selectively activable to sink the current supplied by said current mirror source circuit arrangement and to discharge said capacitor;

means responsive to each said selected electrical polarity transition of said alternating current timing signals for activating said current mirror sink circuit arrangement to discharge said capacitor and thereby produce a variable ignition spark retard value determining electrical signal that varies substantially linearly in potential level magnitude with time and wherein a given variation in potential level magnitude substantially represents an ignition spark event retard value in engine crankshaft degrees;

means for producing an engine speed variable reference potential signal that is a function of the amplitude of said timing signals and that varies directly with engine speed over an engine speed range between said selected first lower and second higher speeds; and means responsive to said variable ignition spark retard value determining signal and said engine speed variable reference potential signal for terminating said ignition spark retard output signal when said variable ignition spark retard value determining signal varies to a potential level magnitude substantially equal to that of said engine speed variable reference potential signal to thereby effect an ignition spark event, the variation in magnitude of said engine speed variable reference potential signal and said ignition spark retard determining signal being such that the amount of ignition retard decreases substantially linearly with increasing engine speed between said first and second selected engine speeds.

5. An internal combustion engine electronic ignition system having an engine speed sensitive variable ignition spark retard feature that is operational only during the presence of at least one selected engine operating paramter to provide an ignition spark retard that diminishes substantially linearly in value from maximum to minimum between selected first lower and second higher engine speeds and being of the type that effects an ignition spark event in response to a selected electrical polarity transition of each of a series of alternating current timing signals that are induced in the pickup coil of an electrical generator assembly having a rotor member rotated in timed relationship with the engine, comprising:

means responsive to each of said series of alternating current timing signals for producing during the half cycle thereof immediately preceding said selected electrical polarity transition an ignition spark retard signal that is effective to override the effect of said alternating current timing signals in a manner to delay the occurrence of an ignition spark event;

a capacitor;

a current mirror source circuit arrangement capable of charging said capacitor upon and during the application of operating potential;

a current mirror sink circuit arrangement selectively activable to sink the current supplied by said current mirror source circuit arrangement and to discharge said capacitor;

means responsive to each said selected electrical polarity transition of said alternating current timing signals for activating said current mirror sink circuit arrangement to discharge said capacitor and thereby produce a variable ignition spark retard value determining electrical signal that varies substantially linearly in potential level magnitude with time and wherein a given variation in potential level magnitude substantially represents an ignition spark event retard value in engine crankshaft degrees;

means for producing an engine speed variable reference potential signal that is a function of the amplitude of said timing signals and that varies directly with engine speed over an engine speed range between said selected first lower and second higher speeds;

means responsive to said variable ignition spark retard value determining signal and said engine speed variable reference potential signal for terminating said ignition spark retard output signal when said variable ignition spark retard value determining signal varies to a potential level magnitude substantially equal to that of said engine speed variable reference potential signal to thereby effect an ignition spark event, the variation in magnitude of said engine speed variable reference potential signal and said ignition spark retard determining signal being such that the amount of ignition retard decreases substantially linearly with increasing engine speed between said first and second selected engine speeds; and means responsive to the further variation of said variable ignition spark retard determining signal in the same direction to another different voltage level of a selected magnitude for deactivating said current mirror sink circuit arrangement whereby said current mirror source circuit arrangement charges said capacitor.

* * * * *